US012697873B2

(12) United States Patent
Ushida et al.

(10) Patent No.: US 12,697,873 B2
(45) Date of Patent: Aug. 4, 2026

(54) STEERING COLUMN STRUCTURE

(71) Applicant: TOYOTA JIDOSHA KABUSHIKI KAISHA, Toyota (JP)

(72) Inventors: Kenji Ushida, Nagoya (JP); Shohei Kinoshita, Nagoya (JP); Shizuo Sanjo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/341,542

(22) Filed: Sep. 26, 2025

(65) Prior Publication Data

US 2026/0097649 A1 Apr. 9, 2026

(30) Foreign Application Priority Data

Oct. 9, 2024 (JP) ................................. 2024-177488

(51) Int. Cl.
B60K 35/22 (2024.01)
B62D 1/187 (2006.01)

(52) U.S. Cl.
CPC .............. B60K 35/22 (2024.01); B62D 1/187 (2013.01); B60K 2360/782 (2024.01)

(58) Field of Classification Search
CPC .......................... B60K 35/22; B60K 2360/782
See application file for complete search history.

(56) References Cited

U.S. PATENT DOCUMENTS

| | | | | |
|---|---|---|---|---|
| 11,034,376 | B2 * | 6/2021 | Appleyard | ............. B62D 1/183 |
| 2024/0101044 | A1 * | 3/2024 | Pop | ......................... B60K 35/60 |

FOREIGN PATENT DOCUMENTS

JP 2024-046633 A 4/2024

* cited by examiner

*Primary Examiner* — Jason D Shanske
*Assistant Examiner* — Matthew James O'Neill
(74) *Attorney, Agent, or Firm* — SoraIP, Inc.

(57) ABSTRACT

The steering column structure includes a display, a steering wheel, a steering column, a combination lever body, and a display support portion. The combination lever body is displaced in the vehicle up-down direction and the front-rear direction as the steering wheel is displaced in the vehicle up-down direction and the front-rear direction. The display support portion includes a front base portion that is supported so as to be tiltable in the vehicle vertical direction about a rotation center on a side opposite to the steering wheel, a rear base portion that supports the display and is supported along the front base portion so as to be displaceable in the vehicle front-rear direction, and a support arm portion that connects the rear base portion and the combination lever body.

2 Claims, 3 Drawing Sheets

STEERING COLUMN STRUCTURE

CROSS-REFERENCE TO RELATED APPLICATION

This application claims priority to Japanese Patent Application No. 2024-177488 filed on Oct. 9, 2024. The disclosure of the above-identified application, including the specification, drawings, and claims, is incorporated by reference herein in its entirety.

BACKGROUND

1. Technical Field

The present disclosure relates to a steering column structure.

2. Description of Related Art

Japanese Unexamined Patent Application Publication No. 2024-46633 (JP 2024-46633 A) discloses a holding mechanism that holds a display provided in a vehicle cabin. The display held by the holding mechanism is disposed to face a driver of the vehicle.

SUMMARY

In the configuration described in JP 2024-46633 A, when the driver of the vehicle adjusts the position of a steering wheel, the relative positional relationship between the steering wheel and the display changes. As a result, the visibility of the display from the driver may change.

In view of the above fact, it is an object of the present disclosure to provide a steering column structure that can suppress a change in a relative positional relationship between a steering wheel and a display.

A steering column structure according to a first aspect includes:

a display configured to display information and oriented toward a driver's seat of a vehicle;

a steering wheel disposed closer to the driver's seat than the display and to be operated by an occupant sitting on the driver's seat;

a steering column that supports the steering wheel such that the steering wheel is displaceable in a vehicle vertical direction and a vehicle front-rear direction;

a combination lever body provided to the steering column and to be displaced in the vehicle vertical direction and the vehicle front-rear direction along with displacement of the steering wheel in the vehicle vertical direction and the vehicle front-rear direction; and a display support portion including a front base portion supported such that the front base portion is tiltable in the vehicle vertical direction about a rotation center opposite to the steering wheel, a rear base portion that supports the display and is supported such that the rear base portion is displaceable in the vehicle front-rear direction along the front base portion, and a support arm portion connecting the rear base portion and the combination lever body.

In the steering column structure according to the first aspect, the steering wheel is supported by the steering column such that the steering wheel is displaceable in the vehicle vertical direction and the vehicle front-rear direction. The steering column is provided with the combination lever body connected to the support arm portion of the display support portion. When the steering wheel is displaced in the vehicle vertical direction, the combination lever body is also displaced in the vehicle vertical direction. Therefore, the front base portion constituting the display support portion is tilted in the vehicle vertical direction together with the rear base portion. As a result, the display can be displaced in the vehicle vertical direction to follow the displacement of the steering wheel in the vehicle vertical direction. When the steering wheel is displaced in the vehicle front-rear direction, the combination lever body is also displaced in the vehicle front-rear direction. Therefore, the rear base portion constituting the display support portion is displaced in the vehicle front-rear direction relative to the front base portion. As a result, the display can be displaced in the vehicle front-rear direction to follow the displacement of the steering wheel in the vehicle front-rear direction. As described above, the steering column structure according to the first aspect can suppress the change in the relative positional relationship between the steering wheel and the display.

In a steering column structure according to a second aspect, in the steering column structure according to the first aspect, the front base portion and the rear base portion are cover members that cover the steering column from a vehicle upper side.

In the steering column structure according to the second aspect, the front base portion and the rear base portion constituting the display support portion are the cover members that cover the steering column from the vehicle upper side. Accordingly, it is possible to suppress a decrease in appearance quality caused when the steering column is viewed from the vehicle upper side.

The steering column structure according to the present disclosure has an excellent effect that the change in the relative positional relationship between the steering wheel and the display can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
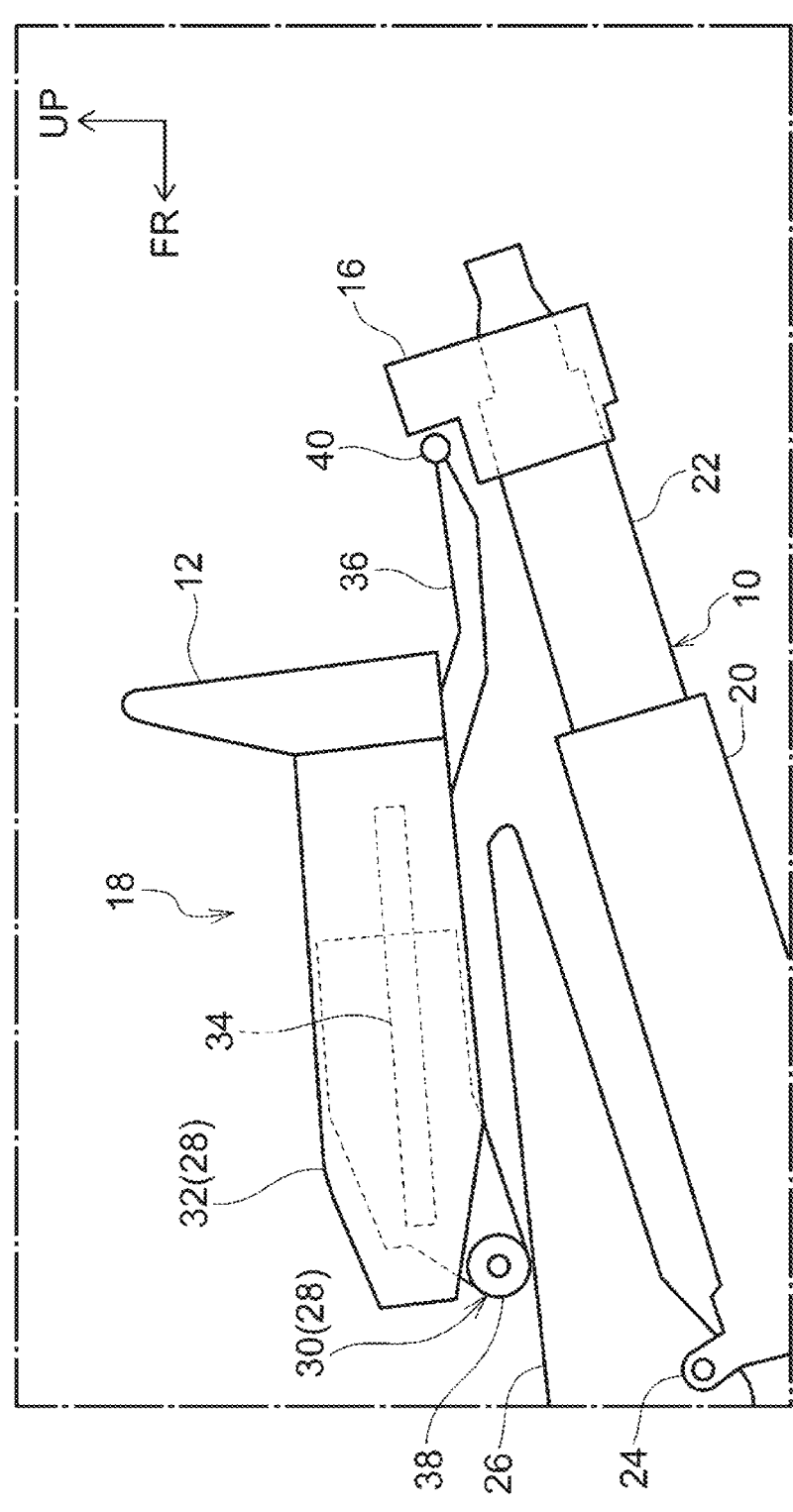
FIG. 1 is a side view schematically showing a periphery of a steering column to which a steering column structure of the present embodiment is applied.

Hereinafter, a steering column structure according to an embodiment of the present disclosure will be described with reference to the drawings. Note that an arrow FR appropriately shown in the drawings indicates a vehicle front side, and an arrow UP indicates a vehicle upper side. Further, in the case of indicating the longitudinal, vertical, and lateral directions without any special description in the following description, it is assumed that the longitudinal, vertical, and lateral directions of the vehicle front-rear direction, the vertical direction of the vehicle, and the lateral direction of the vehicle (vehicle width direction).

As shown in FIG. 1, a display 12, a steering wheel 14 (see FIG. 2), a combination lever body 16, and a display support portion 18 are provided around the steering column 10 to which the steering column structure according to the present embodiment is applied.

The steering column 10 includes a steering column body 20 and a steering support member 22 supported by the steering column body 20. The steering support member 22 protrudes toward the driver's seat side (rear side) with respect to the steering column body 20. A steering wheel 14 (see FIG. 2) is fixed to a distal end portion (rear end portion) of the steering support member 22 in the protruding direction. Further, the amount of projection of the steering support member 22 toward the rear side with respect to the steering column body 20 can be adjusted. A supported portion 24 is provided on the front end side of the steering column body 20. On the upper side of the steering column body 20, a support member 26 extending in the left-right direction on the front side of the driver's seat is provided. The supported portion 24 is rotatably supported by the support member 26 in the left-right direction as the rotation axis direction, so that the steering column 10 can be tilted in the up-down direction.

On the display 12, various kinds of information such as information on a vehicle and map information are displayed. The display 12 is supported by a display support portion 18, which will be described later in detail, in a state of being directed toward the driver's seat side.

The steering wheel 14 is disposed closer to the driver's seat than the display 12 while being supported by the aforementioned steering column 10. When the steering wheel 14 is operated by an occupant seated in the driver's seat, the traveling direction of the vehicle is changed. Further, the position of the steering wheel 14 in the vertical direction is adjusted by tilting the steering column 10 in the vertical direction. Further, the position of the steering wheel 14 in the front-rear direction is adjusted by displacing the steering support member 22 in the front-rear direction with respect to the steering column body 20.

The combination lever body 16 is fixed to a portion of the steering support member 22 on the steering wheel 14 side. Accordingly, the combination lever body 16 is displaced together with the steering support member 22.

The display support portion 18 is disposed on the upper side with respect to the support member 26. The display support portion 18 includes a front base portion 30 and a rear base portion 32 that constitute a cover member 28 that covers the steering column 10 from the upper side, a telescopic portion 34 provided between the front base portion 30 and the rear base portion 32, and a support arm portion 36 that extends from the rear base portion 32 toward the combination lever body 16 side. A supported portion 38 is provided on the front end side of the front base portion 30. The supported portion 38 is rotatably supported by the support member 26 in the left-right direction as the rotation axis direction, so that the display support portion 18 can be tilted in the up-down direction. The rear base portion 32 is supported by the front base portion 30 via the telescopic portion 34. A display 12 is fixed to a rear end portion of the rear base portion 32. Then, the position of the rear base portion 32 in the front-rear direction with respect to the front base portion 30 is changed by the operation of the telescopic portion 34. The support arm portion 36 constitutes a portion that connects the rear base portion 32 and the combination lever body 16. An end portion of the support arm portion 36 opposite to the rear base portion 32 is a ball joint portion 40 formed in a spherical shape. The ball joint portion 40 is spherically supported by a part of the combination lever body 16. In the support arm portion 36, a portion corresponding to the ball joint portion 40 may be supported by a part of the combination lever body 16 so as to be rotatable in the left-right direction as the axial direction.

Operation and Effect of this Embodiment

Next, operations and effects of the present embodiment will be described.

Figure 2:
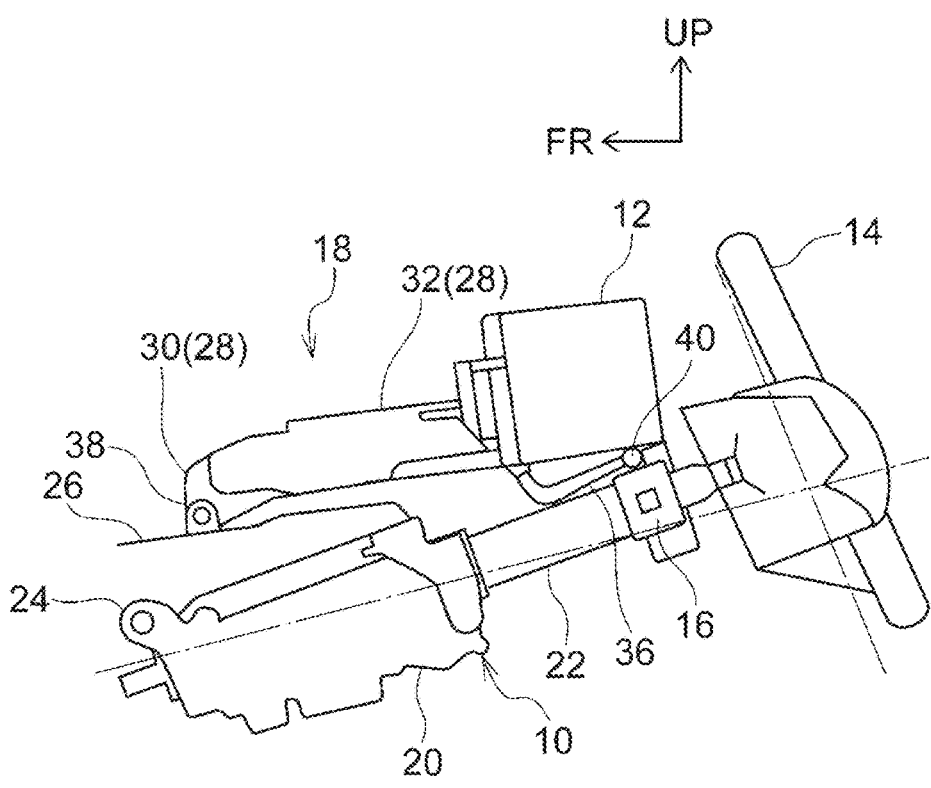
FIG. 2 is a side view showing the periphery of the steering column to which the steering column structure of the present embodiment is applied, and shows a state in which the position of the steering is disposed on the rearmost side and the upper side.
Figure 3:
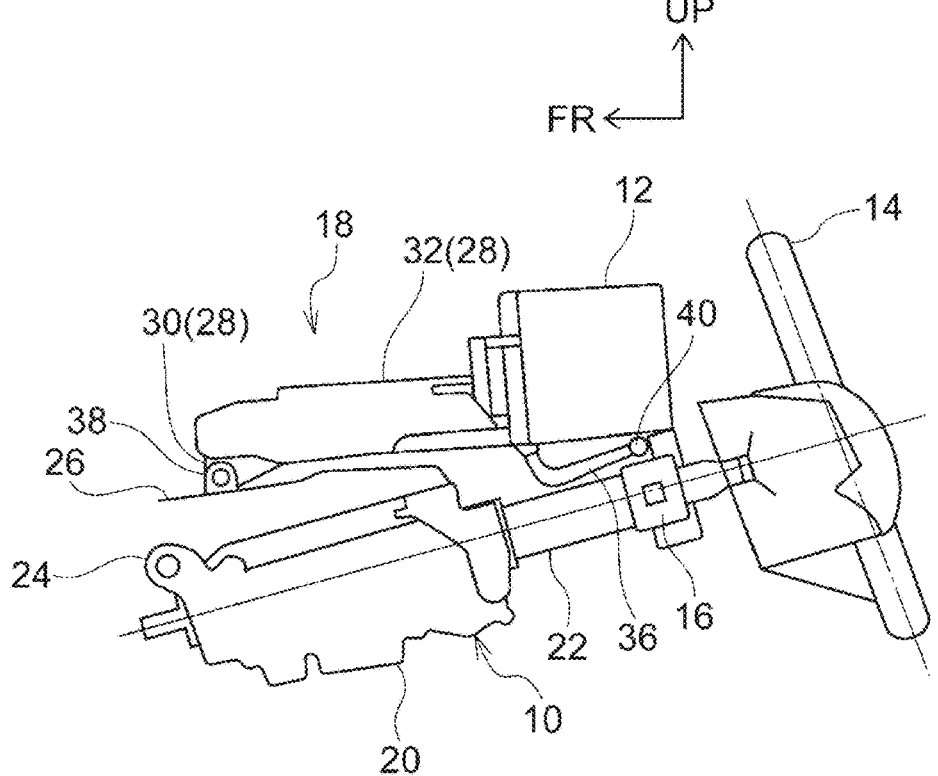
FIG. 3 is a side view showing the periphery of the steering column to which the steering column structure of the present embodiment is applied, and shows a state in which the position of the steering is disposed at the center in the front-rear direction and the center in the up-down direction.
Figure 4:
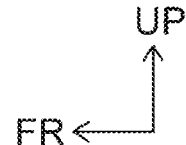
FIG. 4 is a side view showing the periphery of the steering column to which the steering column structure of the present embodiment is applied, and shows a state in which the position of the steering is disposed on the most front side and the lower side.
Figure 4:
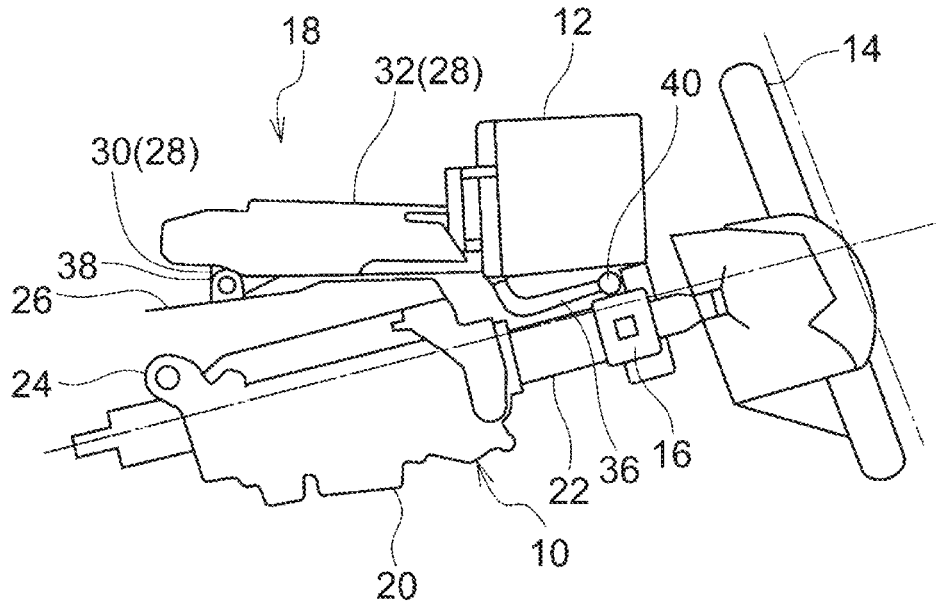

In the present embodiment described above, when the steering wheel 14 is displaced downward from the position shown in FIG. 2, the combination lever body 16 is displaced downward. That is, as shown in FIGS. 2 and 3, when the steering column 10 is tilted downward, the combination lever body 16 is displaced downward.

When the combination lever body 16 is displaced downward, the display support portion 18 is tilted downward. As a result, the display 12 can be displaced downward so as to follow the downward displacement of the steering wheel 14. Similarly, in the case where the steering wheel 14 is displaced upward from the position shown in FIG. 3, the display 12 can be displaced upward so as to follow the upward displacement of the steering wheel 14.

Further, when the steering wheel 14 is displaced to the front side from the position shown in FIG. 2, the combination lever body 16 is displaced to the front side. That is, as shown in FIGS. 2 and 3, when the steering support member 22 is displaced toward the front side with respect to the steering column body 20, the combination lever body 16 is displaced toward the front side.

When the combination lever body 16 is displaced to the front side, the telescopic portion 34 is actuated, and the rear base portion 32 is displaced to the front side with respect to the front base portion 30. As a result, the display 12 can be displaced forward so as to follow the forward displacement of the steering wheel 14. Similarly, when the steering wheel 14 is displaced rearward from the position shown in FIG. 3, the display 12 can be displaced rearward so as to follow the rearward displacement of the steering wheel 14.

As described above, in the present embodiment, it is possible to suppress the change in the relative positional relationship between the steering wheel 14 and the display 12.

Further, in the present embodiment, the front base portion 30 and the rear base portion 32 constituting the display support portion 18 serve as a cover member 28 that covers the steering column 10 from the upper side. Accordingly, it is possible to suppress deterioration in appearance quality caused by the steering column 10 being visually recognized from the upper side.

In the present embodiment, an example has been described in which the front base portion 30 and the rear base portion 32 are the cover member 28 that covers the steering column 10 from the upper side, but the present disclosure is not limited thereto. For example, in a configuration in which another member that covers the steering column 10 from the upper side is provided, a configuration in which the front base portion 30 and the rear base portion 32 are not the cover member 28 may be employed.

Although an embodiment of the present disclosure has been described above, the present disclosure is not limited to the above, and it is needless to say that the present disclosure can be implemented with various modifications other than the above without departing from the gist thereof.

What is claimed is:

1. A steering column structure comprising:

a display configured to display information and oriented toward a driver's seat of a vehicle;

a steering wheel disposed closer to the driver's seat than the display and to be operated by an occupant sitting on the driver's seat;

a steering column that supports the steering wheel such that the steering wheel is displaceable in a vehicle vertical direction and a vehicle front-rear direction;

a combination lever body provided to the steering column and to be displaced in the vehicle vertical direction and the vehicle front-rear direction along with displacement of the steering wheel in the vehicle vertical direction and the vehicle front-rear direction; and a display support portion including a front base portion supported such that the front base portion is tiltable in the vehicle vertical direction about a rotation center opposite to the steering wheel, a rear base portion that supports the display and is supported such that the rear base portion is displaceable in the vehicle front-rear direction along the front base portion, and a support arm portion connecting the rear base portion and the combination lever body.

2. The steering column structure according to claim 1, wherein the front base portion and the rear base portion are cover members that cover the steering column from a vehicle upper side.

* * * * *